US012494559B2

(12) United States Patent
Wang et al.

(10) Patent No.: US 12,494,559 B2
(45) Date of Patent: Dec. 9, 2025

(54) CERAMIC DIELECTRIC BAND-PASS FILTER COMPRISING PLURAL RESONANT CAVITIES CONFIGURED TO FORM A SIXTH-ORDER BAND-PASS FILTER COUPLED TO NOTCH FILTERS

(71) Applicant: XIAMEN SUNYEAR ELECTRONICS CO., LTD, Xiamen (CN)

(72) Inventors: Junyuan Wang, Xiamen (CN); Yufeng Wu, Xiamen (CN); Kangcai Chen, Xiamen (CN); Yi-Ching Lin, Xiamen (CN); Weibin Li, Xiamen (CN)

(73) Assignee: XIAMEN SUNYEAR ELECTRONICS CO., LTD, Xiamen (CN)

( * ) Notice: Subject to any disclaimer, the term of this patent is extended or adjusted under 35 U.S.C. 154(b) by 215 days.

(21) Appl. No.: 18/050,053

(22) Filed: Oct. 27, 2022

(65) Prior Publication Data

US 2023/0420817 A1 Dec. 28, 2023

(30) Foreign Application Priority Data

Jun. 22, 2022 (CN) ......................... 202210708649.3

(51) Int. Cl.
*H01P 1/205* (2006.01)
*H01P 1/203* (2006.01)

(52) U.S. Cl.
CPC ........ *H01P 1/2056* (2013.01); *H01P 1/20309* (2013.01); *H01P 1/205* (2013.01)

(58) Field of Classification Search
CPC .... H01P 1/20309; H01P 1/205; H01P 1/2056; H01P 1/207; H01P 1/209

(Continued)

(56) References Cited

U.S. PATENT DOCUMENTS 5,696,473 A * 12/1997 Tsujiguchi et al. ... H01P 1/2056 333/202
5,790,001 A * 8/1998 Waldo et al. ......... H01P 1/2056 333/202

(Continued)

FOREIGN PATENT DOCUMENTS

CN 1241044 A 1/2000
CN 208753479 U * 4/2019

(Continued)

OTHER PUBLICATIONS

Taiwan Notice of examination opinions, Application No. 111142191, mailed Aug. 21, 2023 (9 pages).

*Primary Examiner* — Benny T Lee

(74) *Attorney, Agent, or Firm* — HOWARD M COHN and Associates, LLC

(57) ABSTRACT

A ceramic dielectric band-pass filter includes a ceramic base, a first input and output electrode, and a second input and output electrode. The ceramic base includes an open surface, a short-circuit surface, and an IO surface. The ceramic base includes first resonant cavities and second resonant cavities penetrating the ceramic base. The first resonant cavities are arranged between the second resonant cavities and are arranged along a length direction of the ceramic base. The first input and output electrode and the second input and output electrode are arranged on the IO surface and extend to the open surface. The first input and output electrode, the second input and output electrode, and the first resonant cavities are coupled to form a sixth-order band-pass filter. The first input and output electrode and the second input and output electrode are coupled with the second resonant cavities to form notch filters.

10 Claims, 7 Drawing Sheets

(58) Field of Classification Search
USPC .......................................................... 333/206
See application file for complete search history.

(56) References Cited

U.S. PATENT DOCUMENTS

| | | | | |
|---|---|---|---|---|
| 7,952,452 | B2 * | 5/2011 | Morga .................. | H01P 1/2056<br>333/202 |
| 10,153,532 | B2 * | 12/2018 | Chou .................... | H01P 1/2002 |

FOREIGN PATENT DOCUMENTS

| | | | | | |
|---|---|---|---|---|---|
| CN | 110120571 | A | | 8/2019 | |
| CN | 212751084 | U | * | 3/2021 | ............ H01P 1/2053 |
| CN | 112635941 | A | | 4/2021 | |
| CN | 111342182 | B | * | 5/2021 | ............ H01P 1/2086 |
| CN | 213460031 | U | * | 6/2021 | |
| JP | 6353938 | B1 | * | 7/2018 | |
| TW | 472444 | B | | 1/2002 | |
| WO | WO-2010033185 | A1 | * | 3/2010 | ............ H01P 1/2056 |

* cited by examiner

CERAMIC DIELECTRIC BAND-PASS FILTER COMPRISING PLURAL RESONANT CAVITIES CONFIGURED TO FORM A SIXTH-ORDER BAND-PASS FILTER COUPLED TO NOTCH FILTERS

TECHNICAL FIELD

The present disclosure relates to a technical field of filter, and in particular to a ceramic dielectric band-pass filter.

BACKGROUND

Ceramic dielectric filters are mainly used in microwave communication systems. Through filtering, a required frequency range is effectively obtained. There are many kinds of communication filters, and different kinds of filters have different application frequency ranges and are applied in different occasions.

Dielectric filters are formed by coupling between dielectric resonant cavities. The dielectric filters are widely used in routers, wireless base stations, satellite communications, and navigation systems, and electronic countermeasurements due to the high Q value thereof, low insertion loss, small size, and light weight. For conventional band-pass filters, an out-of-band suppression is limited under determination of structure and pattern. In order to obtain required frequencies and suppress other unnecessary frequencies as much as possible, manufacturers need to have filters having good suppress performance at high or low frequencies. However, such filters tend to be complex in design and expensive to manufacture.

SUMMARY OF THE INVENTION

Therefore, the present disclosure provides a ceramic dielectric band-pass filter, which integrates two types of filters with different shapes and functions, and has a simple structure design.

The present disclosure provides a ceramic dielectric band-pass filter. The ceramic dielectric band-pass filter comprises a ceramic base, a first input and output electrode, and a second input and output electrode.

The ceramic base comprises an open surface, a short-circuit surface, and an input-output (IO) surface connected the open surface and the short-circuit surface. The ceramic base comprises six first resonant cavities and two second resonant cavities. The six first resonant cavities and the two second resonant cavities penetrate the ceramic base from the open surface to the short-circuit surface. The six first resonant cavities and the two second resonant cavities are arranged along a length direction of the ceramic base. The six first resonant cavities are arranged between the two second resonant cavities.

The first input and output electrode and the second input and output electrode are arranged on two sides of the IO surface of the ceramic base and extend to the open surface of the ceramic base. The first input and output electrode, the second input and output electrode, and the six first resonant cavities are coupled to form a sixth-order band-pass filter. The first input and output electrode and the second input and output electrode are respectively coupled with a respective second resonant cavity to form two notch filters.

Optionally, the six first resonant cavities are arranged side by side on the ceramic base at a same height and are arranged in a center of the open surface of the ceramic base. The two second resonant cavities are arranged on the ceramic base at a same height. The height of each of the two second resonant cavities is less than the height of each of the six first resonant cavities.

Optionally, the six first resonant cavities are through holes. A diameter of each of the six first resonant cavities ranges from 0.3-1 mm.

Optionally, the two second resonant cavities are asymmetric equal-diameter holes.

Optionally, the two second resonant cavities are coaxial stepped holes. Each of the two second resonant cavities comprises a first hole section and a second hole section communicates with the first hole section. One end of each first hole section is located on the open surface of the ceramic base. One end of the second hole section is located on the short-circuit surface of the ceramic base. A diameter of each first hole section is greater than a diameter of each second hole section.

Optionally, a diameter ratio of each first hole section and each second hole section ranges from 1.1-2.5. A length ratio of each first hole section and the second hole section ranges from 0.25-0.85.

Optionally, the ceramic dielectric band-pass filter further comprises a shielding cover. The shielding cover comprises a shielding plate vertically arranged and a mounting plate connected with the shielding plate. The shielding plate is horizontally supported on the open surface of the ceramic base. The mounting plate is arranged on a bottom surface of the ceramic base. A distance between the shielding plate and the open surface ranges from 0.3-2.5 mm. The mounting plate comprises limit blocks. The limit blocks are a pair of protrusions arranged on the mounting plate. The limit blocks are hooked on the bottom surface of the ceramic base to limit a mounting position of the mounting plate relative to the ceramic base.

Optionally, the inner walls of the six first resonant cavities and inner wall of the two second resonant cavities are coated with metal. One end of each of the six first resonant cavities located at the short-circuit surface of the ceramic base and one end of each of the two second resonant cavities located at the short-circuit surface of the ceramic base are coated with the metal. A thickness of the metal ranges from 4~20 um.

Optionally, the open surface of the ceramic base defines a first hollow area. The first hollow area comprises a first sub-area, a second sub-area, a third sub-area, a fourth sub-area, and a fifth sub-area. The first sub-area, the second sub-area, the third sub-area, the fourth sub-area, and a fifth sub-area are arranged at intervals, the first sub-area and the fifth sub-area respectively surround two outermost first resonant cavities of the six first resonant cavities. The third sub-area surrounds two middle first resonator cavities of the six first resonant cavities. The second sub-area and the fourth sub-area respectively surround rest two first resonant cavities of the six first resonant cavities.

Optionally, the IO surface of the ceramic base defines two second hollow areas. The two second hollow areas are not in contact with each other. Each of the second hollow areas extends to the open surface of the ceramic base and is connected with the first hollow area. The first input and output electrode and the second input and output electrode are arranged in a respective second hollow area of the second hollow areas. The first input and output electrode and the second input and output electrode partially extend to the open surface of the ceramic base.

In summary, in the ceramic dielectric band-pass filter of the present disclosure, the six first resonant cavities and the two second resonant cavities penetrate the ceramic base along a horizontal direction are defined on the ceramic base. The first input and output electrode, the second input and output electrode, and the six first resonant cavities are coupled to form the sixth-order band-pass filter. The two second resonant cavities are respectively coupled with the first input and output electrode and the second input and output electrode to form two notch filters. The present disclosure integrates two filters with different shapes and functions to form a multi-cavity band-pass filter with excellent out-of-band suppression performance, and the structure of the ceramic dielectric band-pass filter of the present disclosure is concise.

Figure 1:
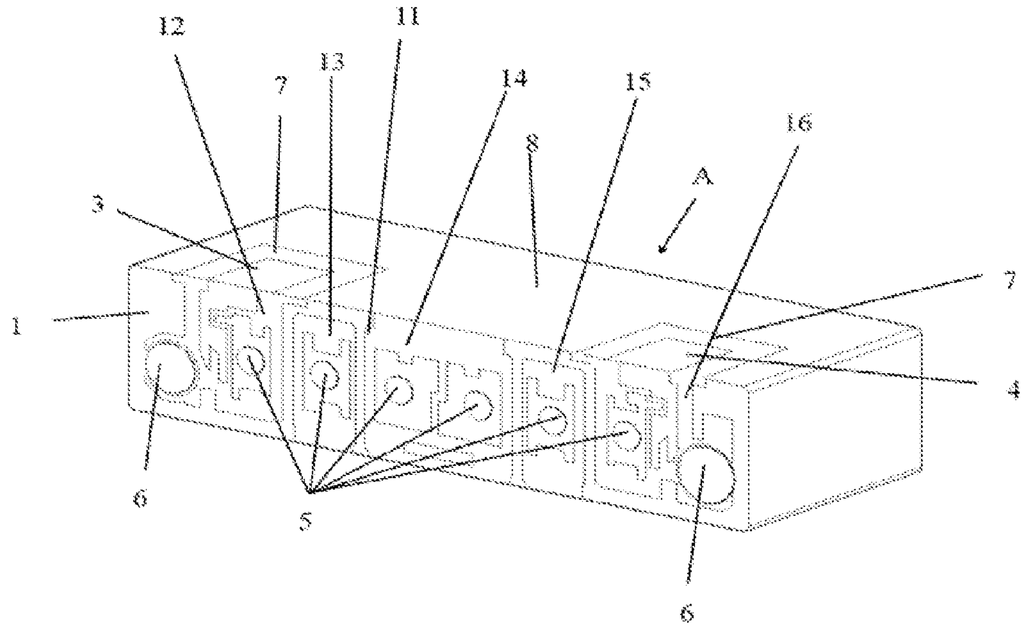
FIG. 1 is a front side schematic diagram of a ceramic dielectric band-pass filter according to one embodiment of the present disclosure.

Ceramic base—A; open surface—1; short-circuit surface—2; first input and output electrode—3; second input and output electrode—4; first resonant cavity—5; second resonant cavity—6; input-output (IO) surface—8; shielding cover—20; first hollow area—11; second hollow area—7; first sub-area—12; second sub-area—13; third sub-area—14; fourth sub-area—15; fifth sub-area—16.

DETAILED DESCRIPTION OF THE INVENTION

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure. Accordingly, the following detailed description of the embodiments of the present disclosure provided in the accompanying drawings is not intended to limit the protection scope of the present disclosure, but is merely representative of optional embodiments of the present disclosure. Based on the embodiments of the present disclosure, all other embodiments obtained by those of ordinary skill in the art without creative work shall fall within the protection scope of the present disclosure.

It should be noted that in the description of the present disclosure, terms such as “upper”, “lower”, etc. indicate direction or position relationships shown based on the drawings, and are only intended to facilitate the description of the present disclosure and the simplification of the description rather than to indicate or imply that the indicated device or element must have a specific direction or constructed and operated in a specific direction, and therefore, shall not be understood as a limitation to the present disclosure.

In addition, terms such as “first” and “second” are only used for the purpose of description, rather than being understood to indicate or imply relative importance or hint the number of indicated technical features. Thus, the feature limited by “first” and “second” can explicitly or impliedly include one or more features. In the description of the present disclosure, the meaning of “a plurality of” is two or more unless otherwise specified.

It should be noted in the description of the present disclosure that, unless otherwise regulated and defined, terms such as “installation,” “bonded,” and “connection” shall be understood in broad sense, and for example, may refer to fixed connection or detachable connection or integral connection; may refer to mechanical connection or electrical connection; and may refer to direct connection or indirect connection through an intermediate medium or inner communication of two elements. For those of ordinary skill in the art, the meanings of the above terms in the present disclosure may be understood according to concrete conditions.

Figure 2:
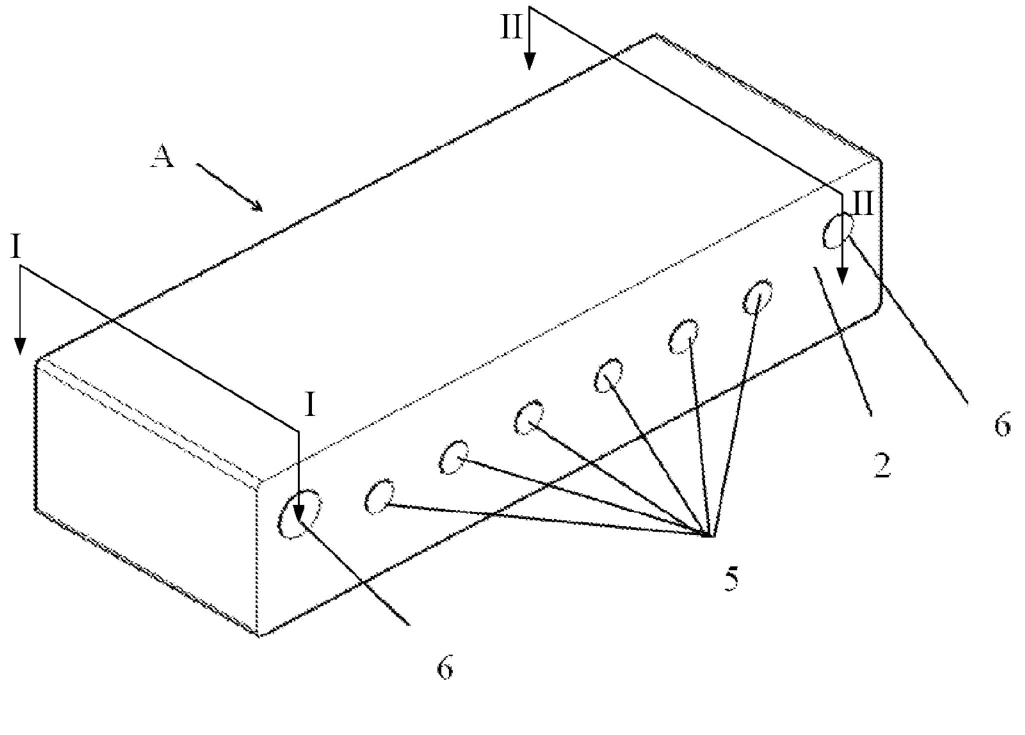
FIG. 2 is a rear side schematic diagram of the ceramic dielectric band-pass filter according to one embodiment of the present disclosure.
Figure 3:
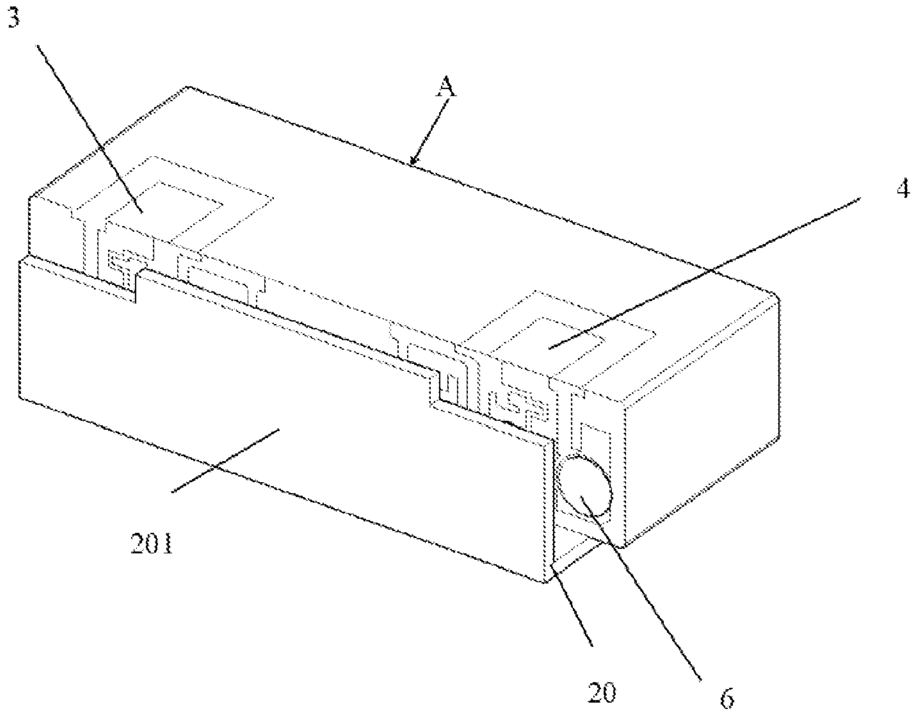
FIG. 3 is a front side schematic diagram of a shielding cover of the ceramic dielectric band-pass filter according to one embodiment of the present disclosure.

The present disclosure will be described in further detail below in conjunction with the accompanying drawings and specific embodiments:

As shown in FIGS. 1-7, in one embodiment, the present disclosure provides a ceramic dielectric band-pass filter. The ceramic dielectric band-pass filter comprises a ceramic base A (FIGS. 1-4), a first input and output electrode 3 (FIGS. 1 and 3), and a second input and output electrode 4 (FIGS. 1 and 3). The ceramic base A comprises an open surface 1 (FIG. 1), a short-circuit surface 2 (FIGS. 2 and 4), and an input-output (IO) surface 8 (FIG. 1) connected the open surface 1 and the short-circuit surface 2. The ceramic base A comprises six first resonant cavities 5 (FIGS. 1 and 2) and two second resonant cavities 6 (FIGS. 1-3). The six first resonant cavities 5 and the two second resonant cavities 6 penetrate the ceramic base A from the open surface 1 to the short-circuit surface 2. The six first resonant cavities 5 and the two second resonant cavities 6 are arranged along a length direction of the ceramic base A. The six first resonant cavities 5 are arranged between the two second resonant cavities 6.

The first input and output electrode 3 and the second input and output electrode 4 are arranged on two sides of the IO surface 8 of the ceramic base A and extend to the open surface 1 of the ceramic base A. The first input and output electrode 3, the second input and output electrode 4, and the six first resonant cavities 5 are coupled to form a sixth-order band-pass filter. The first input and output electrode 3 and the second input and output electrode 4 are respectively coupled with a respective second resonant cavity 6 to form two notch filters.

Specifically, in the embodiment, the ceramic base A has a rectangular parallelepiped structure. The ceramic base A is made of microwave dielectric materials or other organic dielectric substances. In one embodiment, the ceramic base A is fired from high-dielectric dielectric ($\varepsilon\gamma$=5-20) microwave powder. A length of the ceramic base A ranges from 8.0-10.0 mm. A width of the ceramic base A ranges from 1.5-3 mm, and a height of the ceramic base A ranges from 1.5-2.5-4.5 mm.

In the embodiment, a position of each of the two second resonant cavities is less lower than a position of each of the six first resonant cavities, a diameter of each of the two second resonant cavities is variable in a direction from the open surface to the short-circuit surface, and a resonant frequency of the ceramic dielectric band-pass filter is adjusted by adjusting positions of the first resonant cavities and the second resonant cavities on the ceramic base A, so that the resonant frequency of the ceramic dielectric band-pass filter reaches a desired frequency to form resonance. The specific heights of the first resonant cavities and the second resonant cavities depend on the situation, which is not specifically limited thereto.

In one embodiment, the six first resonant cavities 5 are arranged side by side on the ceramic base A at a same height and are arranged in a center of the open surface 1 of the ceramic base A. The two second resonant cavities 6 are arranged on the ceramic base A at a same height. The height of each of the two second resonant cavities 6 is less than the height of each of the six first resonant cavities 5. The height hereto is relative to a reference plane that is a bottom surface opposite to the IO surface 8. Namely, a distance between an axis of each of the second resonant cavities 6 and the bottom surface is less than a distance between an axis of each of the first resonant cavities 5 and the bottom surface.

In the embodiment, the six first resonant cavities 5 are through holes. A diameter of each of the six first resonant cavities 5 ranges from 0.3-1 mm.

Figure 8A:
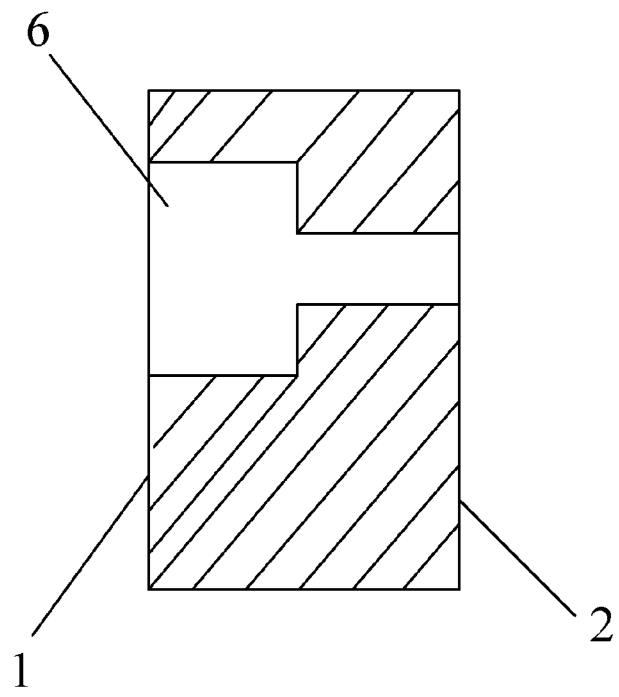
FIG. 8A is a cross-sectional view of the ceramic dielectric band-pass filter shown in FIG. 2, taken along a line I-I.
Figure 8B:
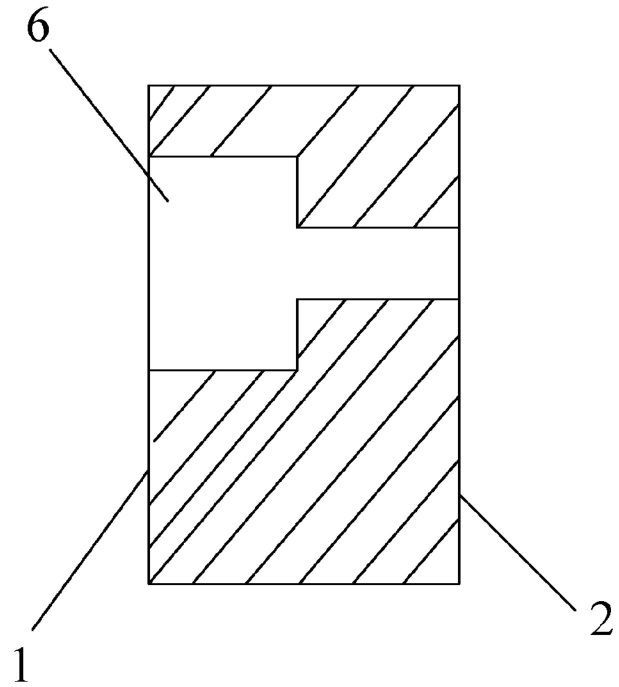
FIG. 8B is a cross-sectional view of the ceramic dielectric band-pass filter shown in FIG. 2, taken along a line II-II.

In the embodiment, the two second resonant cavities 6 are asymmetric equal-diameter holes. Specifically, as shown in FIGS. 8A and 8B, the two second resonant cavities 6 are coaxial stepped holes. Each of the two second resonant cavities 6 comprises a first hole section and a second hole section communicated with the first hole section. One end of each first hole section is located on the open surface 1 of the ceramic base A. A first end of the second hole section is located on the short-circuit surface 2 of the ceramic base A. A second end of the second hole section is communicated with the first hole section. A diameter ratio of each first hole section and each second hole section ranges from 1.1-2.5. A length ratio of each first hole section and the second hole section ranges from 0.25-0.85.

In the embodiment, the inner walls of the six first resonant cavities 5 and inner wall of the two second resonant cavities 6 are coated with metal. A thickness of the metal ranges from 4~20 um.

Optionally, as shown in FIG. 1, the open surface 1 of the ceramic base A defines a first hollow area 11. The first hollow area 11 comprises a first sub-area 12, a second sub-area 13, a third sub-area 14, a fourth sub-area 15, and a fifth sub-area 16. The first sub-area 12, the second sub-area 13, the third sub-area 14, the fourth sub-area 15, and a fifth sub-area 16 are arranged at intervals. The first sub-area 12 and the fifth sub-area 16 respectively surround two outermost first resonant cavities 5 of the six first resonant cavities 5 (the two first resonant cavities 5 respectively adjacent to the second resonant cavities 6, that is, the first resonant cavity 5 and the sixth first resonant cavity 5 in order). The third sub-area 14 surrounds two middle first resonator cavities 5 of the six first resonant cavities 5 (the third first resonant cavity 5 and the fourth first resonant cavity 5 in order). The second sub-area 13 and the fourth sub-area 15 respectively surround rest two first resonant cavities of the six first resonant cavities (the second first resonant cavity 5 and the fifth first resonant cavity 5 in order).

Optionally, as shown in FIG. 1, the IO surface 8 of the ceramic base A defines two second hollow areas 7. There is a certain isolation area between the two second hollow areas 7. The two second hollow areas 7 are not in contact with each other. Each of the second hollow areas 7 extends to the open surface 1 of the ceramic base A and is connected with the first hollow area 11. The first input and output electrode 3 and the second input and output electrode 4 are arranged in a respective second hollow area of the second hollow areas 7. The first input and output electrode 3 and the second input and output electrode 4 partially extend to the open surface 1 of the ceramic base A.

The first input and output electrode 3 and the second input and output electrode 4 may be covered on the ceramic base A by silk-screen printing, or the first input and output electrode 3 and the second input and output electrode 4 may be formed by etching and coating a metal layer on an outer surface of the ceramic base A by means of a laser or the like, which is not specifically limited in the present disclosure.

In one embodiment, as shown in FIG. 3, the ceramic dielectric band-pass filter further comprises a shielding cover 20.

The shielding cover 20 is made of alloy.

Figure 4:
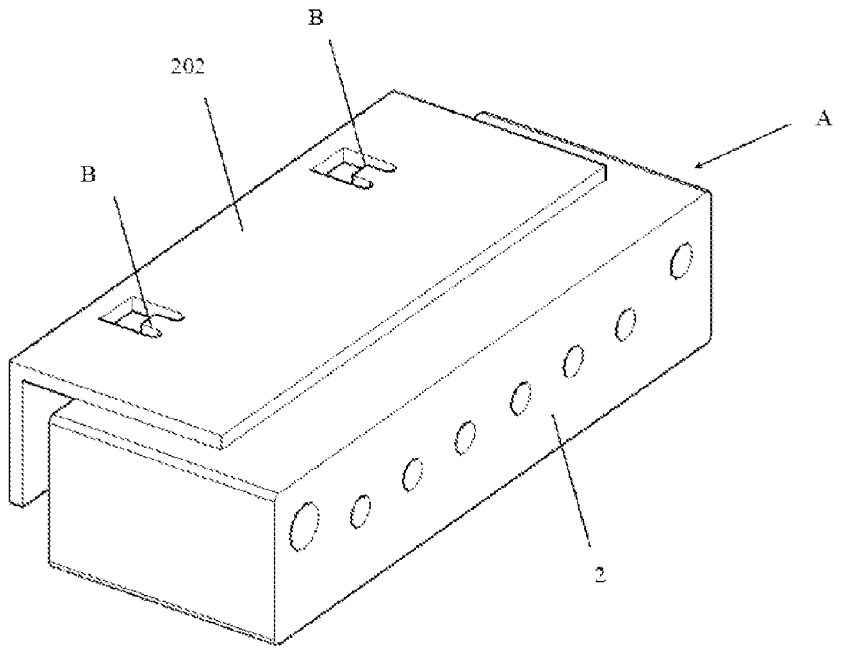
FIG. 4 is a rear side schematic diagram of the shielding cover of the ceramic dielectric band-pass filter according to one embodiment of the present disclosure.

The shielding cover 20 comprises a shielding plate 201 vertically arranged and a mounting plate 202 (FIG. 4) connected with the shielding plate 201. The shielding plate 201 is horizontally supported on the open surface 1. The mounting plate 202 is arranged on the bottom surface of the ceramic base. A distance between the shielding plate 201 and the open surface 1 of the ceramic base A ranges from 0.3-2.5 mm. The mounting plate 202 comprises limit blocks B, as shown in FIG. 4. The limit blocks B are configured to limit a mounting position of the mounting plate 202 relative to the ceramic base A.

Specifically, the limit blocks B are a pair of protrusions arranged on the mounting plate. The limit blocks B are hooked on the bottom surface of the ceramic base, so the shielding cover 20 is joined to the ceramic base and its outer metal is regarded as a whole (as shown in FIGS. 3 and 4).

In the embodiment, the ceramic dielectric band-pass filter reduces electromagnetic coupling interference of the resonant cavities after the shielding cover 20 is welded.

In summary, in the ceramic dielectric band-pass filter of the present disclosure, the six first resonant cavities 5 and the two second resonant cavities 6 penetrate the ceramic base A along a horizontal direction are defined on the ceramic base A. The first input and output electrode 3, the second input and output electrode 4, and the six first resonant cavities 5 are coupled to form the sixth-order band-pass filter. The two second resonant cavities 6 are respectively coupled with the first input and output electrode 3 and the second input and output electrode 4 to form two notch filters. The present disclosure integrates two filters with different shapes and functions to form a multi-cavity band-pass filter with excellent out-of-band suppression performance, and the structure of the ceramic dielectric band-pass filter of the present disclosure is concise.

Figure 5:
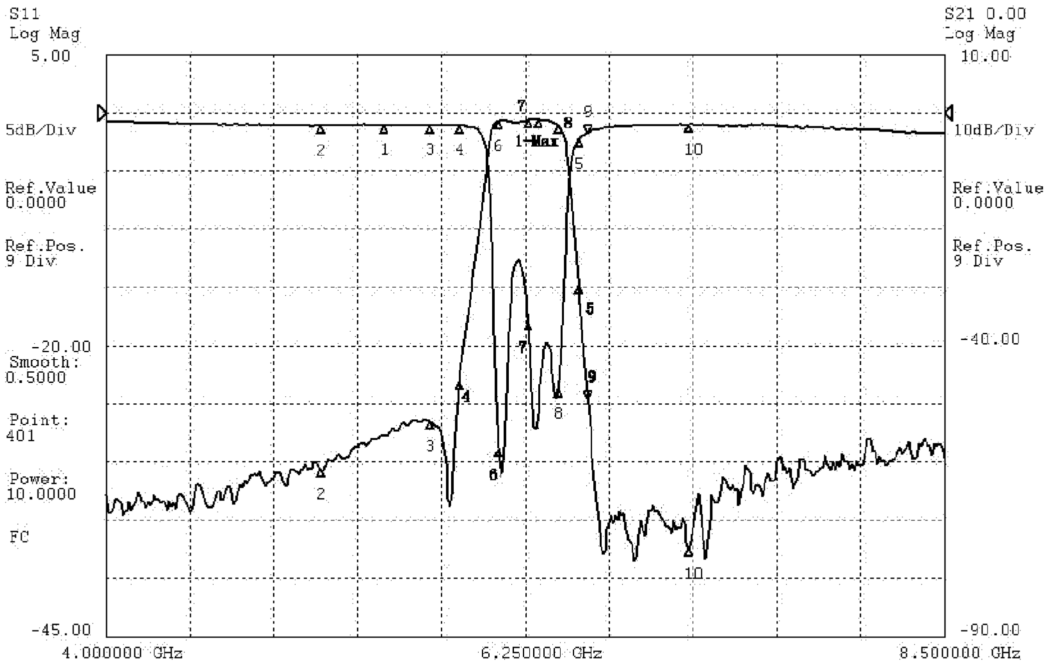
FIG. 5 is a circuit characteristic curve of a six-order band-pass filter of the ceramic dielectric band-pass filter according to one embodiment of the present disclosure after welding with the shielding cover.
Figure 6:
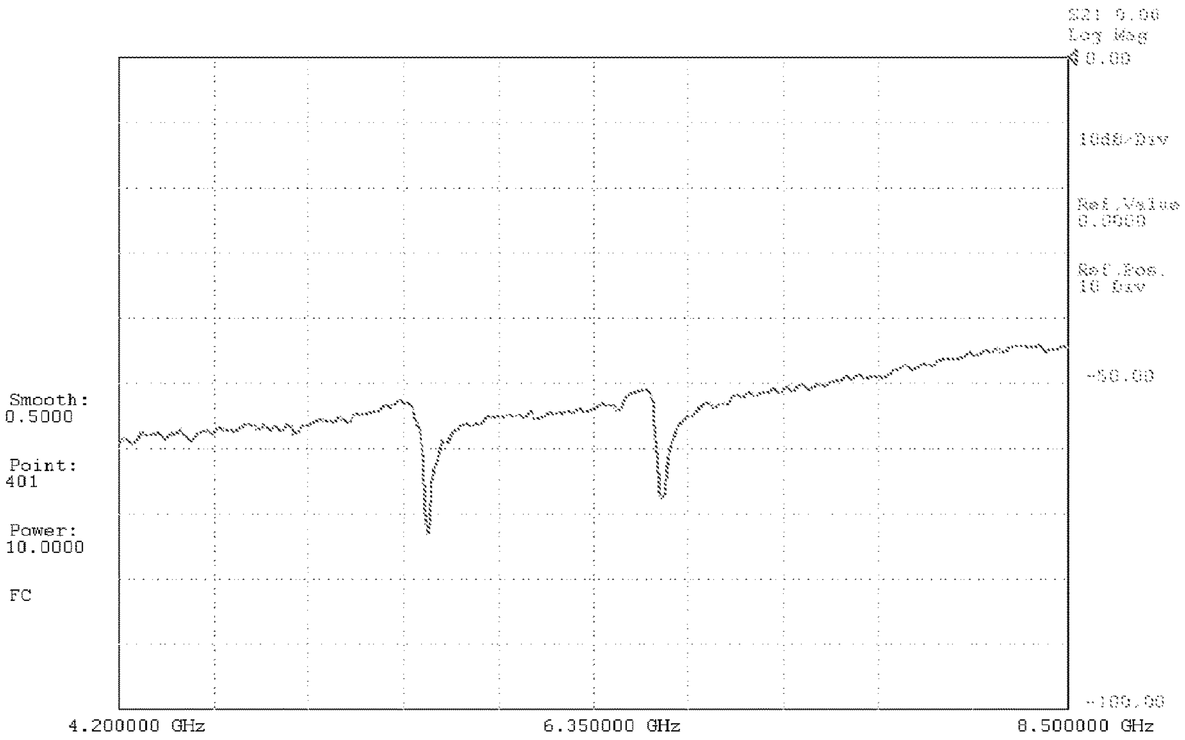
FIG. 6 is a circuit characteristic curve of notch filters of the ceramic dielectric band-pass filter according to one embodiment of the present disclosure after welding with the shielding cover.
Figure 7:
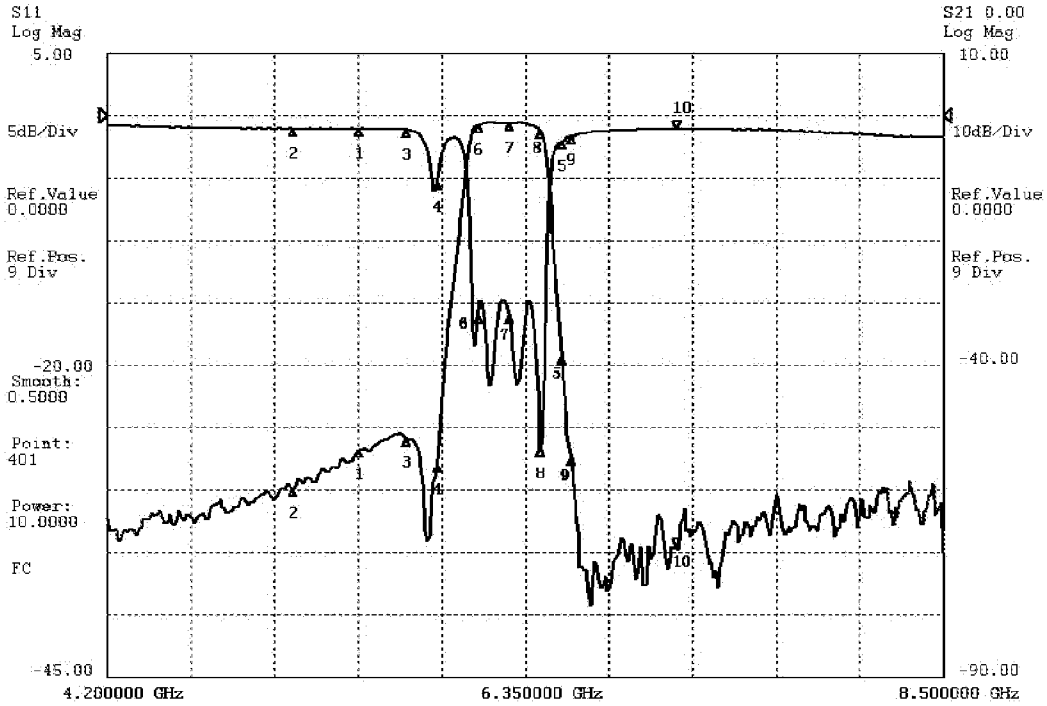
FIG. 7 is a circuit characteristic curve of the six-order ban-pass filter and the notch filters of the ceramic dielectric band-pass filter according to one embodiment of the present disclosure after welding with the shielding cover.

As shown in FIGS. 5-7, FIG. 5 is a circuit characteristic curve of the six-order band-pass filter after welding with the shielding cover, FIG. 6 is a circuit characteristic curve of notch filters after welding with the shielding cover, and FIG. 7 is a circuit characteristic curve of the six-order band-pass filter and the notch filters after welding with the shielding cover. In FIGS. 5-7, "Log Mag" refers to the logarithmic magnitude, "ref. Value" refers to the reference value, and "ref. Pos" refers to the reference position.

Specifically, as shown in FIG. 5, an out-of-band suppression of the sixth-order band-pass filter is about 46 dB near a low-end frequency of 5895 MHz, and the out-of-band suppression near a high-end frequency of 6585 MHz is about 49 dB. As shown in FIG. 6, since the ceramic dielectric band-pass filter simultaneously forms high suppression notches at the low-end frequency and the high-end frequency, out-of-band suppression of the notch filters is improved to about 56 dB near the low-end frequency of 5895 MHz., and the out-of-band suppression near the high-end frequency of 6585 MHz is improved to about 54 dB.

As shown in FIG. 7, a center frequency of the ceramic dielectric band-pass filter in the embodiment is 6265 MHz, a bandwidth thereof is 320 MHz, a frequency difference between the low-end frequency of 5895 MHz and the low-end passband is 210 MHz, and a frequency difference between the high-end frequency of 6585 MHz and the high-end passband is 160 MHz. Therefore, the ceramic dielectric band-pass filter of the present disclosure is especially suitable for use in a required bandwidth with 200-500 MHz, which is generally suitable for a bandpass filter with high attenuation rejection outside the passband.

Foregoing descriptions are only optional embodiments of the present disclosure and are not intended to limit the present disclosure. Any modification, equivalent replacement, or improvement within the technical scope of the present disclosure should be included in the protection scope of the present disclosure.

What is claimed is:

1. A ceramic dielectric band-pass filter, comprising:

a ceramic base;

a first input and output electrode; and a second input and output electrode;

wherein the ceramic base comprises an open surface, a short-circuit surface, and an input-output (IO) surface connected with the open surface and the short-circuit surface; the ceramic base comprises six first resonant cavities and two second resonant cavities; the six first resonant cavities and the two second resonant cavities penetrate the ceramic base from the open surface to the short-circuit surface; the six first resonant cavities and the two second resonant cavities are arranged along a length direction of the ceramic base; the six first resonant cavities are arranged between the two second resonant cavities;

wherein the first input and output electrode and the second input and output electrode are arranged on the IO surface of the ceramic base and are spaced apart from each other and extend to the open surface of the ceramic base; the first input and output electrode, the second input and output electrode, and the six first resonant cavities are coupled to form a sixth-order band-pass filter;

the first input and output electrode and one of the two second resonant cavities are coupled to each other to form one notch filter, and the second input and output electrode and the other one of the two second resonant cavities are coupled to each other to form another notch filter; a position of each of the two second resonant cavities is lower than a position of each of the six first resonant cavities; a diameter of each of the two second resonant cavities is variable in a direction from the open surface to the short-circuit surface;

wherein the ceramic dielectric band-pass filter further comprises a shielding cover; the shielding cover comprises a shielding plate and a mounting plate connected with the shielding plate; the shielding plate is supported on the open surface of the ceramic base; the mounting plate is arranged on a bottom surface of the ceramic base; a distance between the shielding plate and the open surface of the ceramic base ranges from 0.3-2.5 mm; the mounting plate comprises limit blocks; the limit blocks are a pair of protrusions arranged on the mounting plate; and the limit blocks are configured to limit a mounting position of the mounting plate relative to the ceramic base.

2. The ceramic dielectric band-pass filter according to claim 1, wherein the six first resonant cavities are arranged side by side on the ceramic base at a first height and are arranged in a center of the open surface of the ceramic base; the two second resonant cavities are arranged on the ceramic base at a second height.

3. The ceramic dielectric band-pass filter according to claim 1, wherein the six first resonant cavities are through holes; a diameter of each of the six first resonant cavities ranges from 0.3-1 mm.

4. The ceramic dielectric band-pass filter according to claim 1, wherein inner walls of the six first resonant cavities and inner walls of the two second resonant cavities are each coated with metal; one end of each of the six first resonant cavities located at the short-circuit surface of the ceramic base and one end of each of the two second resonant cavities located at the short-circuit surface of the ceramic base are coated with the metal; a thickness of the metal ranges from 4~20 um.

5. The ceramic dielectric band-pass filter according to claim 1, wherein the two second resonant cavities are coaxial stepped holes; each of the two second resonant cavities comprises a first hole section and a second hole section communicating with the first hole section; one end of each first hole section is located on the open surface of the ceramic base; one end of the second hole section is located on the short-circuit surface of the ceramic base; a diameter of each first hole section is greater than a diameter of each second hole section.

6. The ceramic dielectric band-pass filter according to claim 5, wherein a diameter ratio of each first hole section and each second hole section ranges from 1.1-2.5; a length ratio of each first hole section and the second hole section ranges from 0.25-0.85.

7. The ceramic dielectric band-pass filter according to claim 1, wherein the open surface of the ceramic base defines a first hollow area; the first hollow area comprises a first sub-area, a second sub-area, a third sub-area, a fourth sub-area, and a fifth sub-area; the first sub-area, the second sub-area, the third sub-area, the fourth sub-area, and a fifth sub-area are arranged at intervals, the first sub-area and the fifth sub-area respectively surround two outermost first resonant cavities of the six first resonant cavities; the third sub-area surrounds two middle first resonator cavities of the six first resonant cavities; the second sub-area and the fourth sub-area respectively surround rest two first resonant cavities of the six first resonant cavities.

8. The ceramic dielectric band-pass filter according to claim 7, wherein the IO surface of the ceramic base defines two second hollow areas; the two second hollow areas are not in contact with each other; each of the second hollow areas extends to the open surface of the ceramic base and is connected with the first hollow area; the first input and output electrode and the second input and output electrode are arranged in a respective second hollow area of the second hollow areas; the first input and output electrode and the second input and output electrode partially extend to the open surface of the ceramic base.

9. A ceramic dielectric band-pass filter, comprising:

a ceramic base;

a first input and output electrode; and a second input and output electrode;

wherein the ceramic base comprises an open surface, a short-circuit surface, and an input-output (IO) surface connected with the open surface and the short-circuit surface; the ceramic base comprises six first resonant cavities and two second resonant cavities; the six first resonant cavities and the two second resonant cavities penetrate the ceramic base from the open surface to the short-circuit surface; the six first resonant cavities and the two second resonant cavities are arranged along a length direction of the ceramic base; the six first resonant cavities are arranged between the two second resonant cavities;

wherein the first input and output electrode and the second input and output electrode are arranged on the IO surface of the ceramic base and are spaced apart from each other and extend to the open surface of the ceramic base; the first input and output electrode, the second input and output electrode, and the six first resonant cavities are coupled to form a sixth-order band-pass filter;

the first input and output electrode and one of the two second resonant cavities are coupled to each other to form one notch filter, and the second input and output electrode and the other one of the two second resonant cavities are coupled to each other to form another notch filter; a position of each of the two second resonant cavities is lower than a position of each of the six first resonant cavities; a diameter of each of the two second resonant cavities is variable in a direction from the open surface to the short-circuit surface;

wherein the six first resonant cavities are through holes; a diameter of each of the six first resonant cavities ranges from 0.3-1 mm.

10. A ceramic dielectric band-pass filter, comprising:

a ceramic base;

a first input and output electrode; and a second input and output electrode;

wherein the ceramic base comprises an open surface, a short-circuit surface, and an input-output (IO) surface connected with the open surface and the short-circuit surface; the ceramic base comprises six first resonant cavities and two second resonant cavities; the six first resonant cavities and the two second resonant cavities penetrate the ceramic base from the open surface to the short-circuit surface; the six first resonant cavities and the two second resonant cavities are arranged along a length direction of the ceramic base; the six first resonant cavities are arranged between the two second resonant cavities;

wherein the first input and output electrode and the second input and output electrode are arranged on the IO surface of the ceramic base and are spaced apart from each other and extend to the open surface of the ceramic base; the first input and output electrode, the second input and output electrode, and the six first resonant cavities are coupled to form a sixth-order band-pass filter; the first input and output electrode and one of the two second resonant cavities are coupled to each other to form one notch filter, and the second input and output electrode and the other one of the two second resonant cavities are coupled to each other to form another notch filter; a position of each of the two second resonant cavities is lower than a position of each of the six first resonant cavities; a diameter of each of the two second resonant cavities is variable in a direction from the open surface to the short-circuit surface;

wherein inner walls of the six first resonant cavities and inner walls of the two second resonant cavities are each coated with metal; one end of each of the six first resonant cavities located at the short-circuit surface of the ceramic base and one end of each of the two second resonant cavities located at the short-circuit surface of the ceramic base are coated with the metal; a thickness of the metal ranges from 4~20 um.

* * * * *